Feb. 15, 1927.

H. F. HITNER 1,618,089

APPARATUS FOR CUTTING GLASS

Filed Sept. 11, 1923    3 Sheets-Sheet 1

INVENTOR
H. F. Hitner.
by
James C. Bradley
atty.

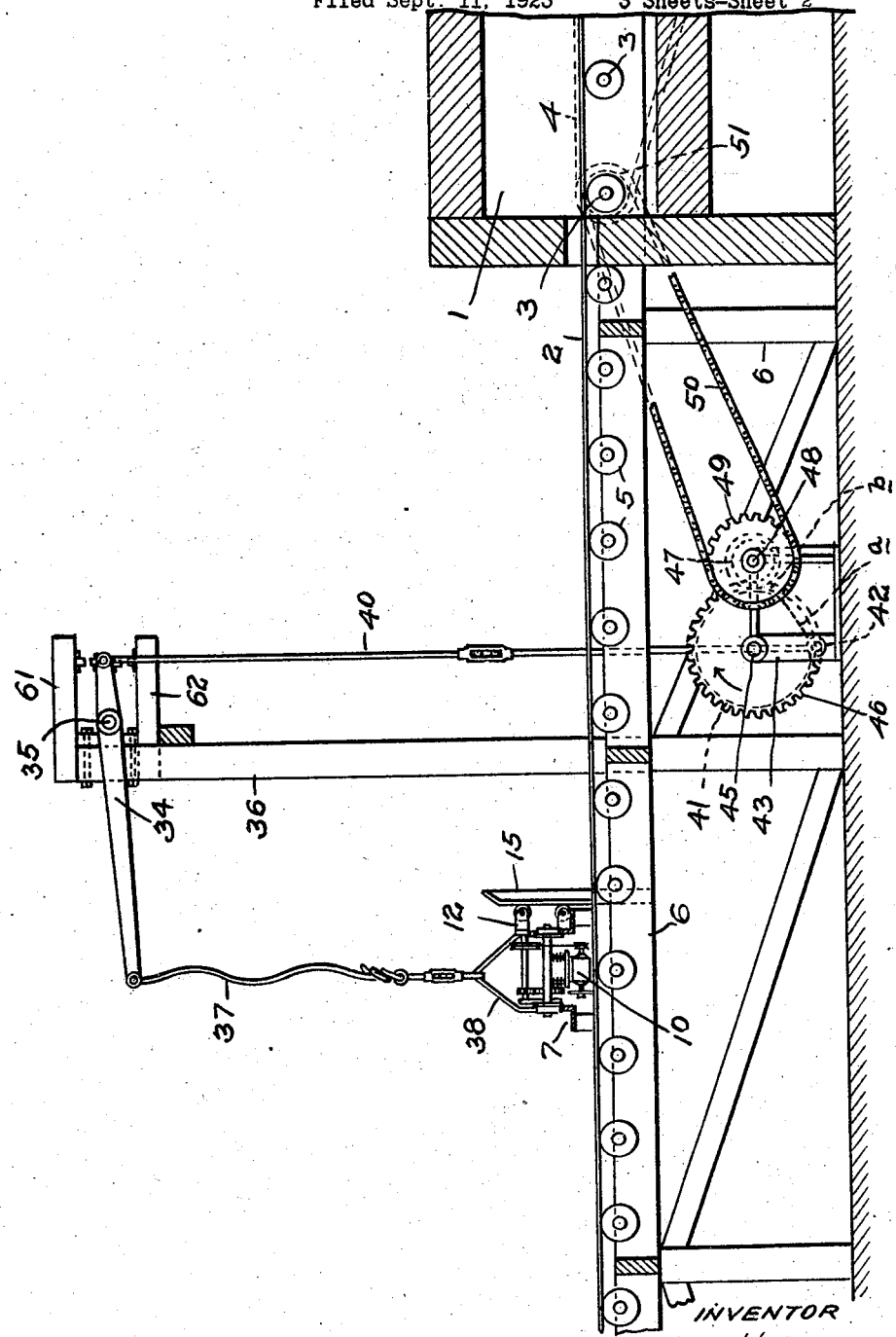

Feb. 15, 1927.

H. F. HITNER 1,618,089

APPARATUS FOR CUTTING GLASS

Filed Sept. 11, 1923   3 Sheets-Sheet 3

INVENTOR
H. F. Hitner
by
James C. Bradley

Patented Feb. 15, 1927.

1,618,089

UNITED STATES PATENT OFFICE.

HARRY F. HITNER, OF PITTSBURGH, PENNSYLVANIA, ASSIGNOR TO PITTSBURGH PLATE GLASS COMPANY, A CORPORATION OF PENNSYLVANIA.

APPARATUS FOR CUTTING GLASS.

Application filed September 11, 1923. Serial No. 662,071.

Figure 1:
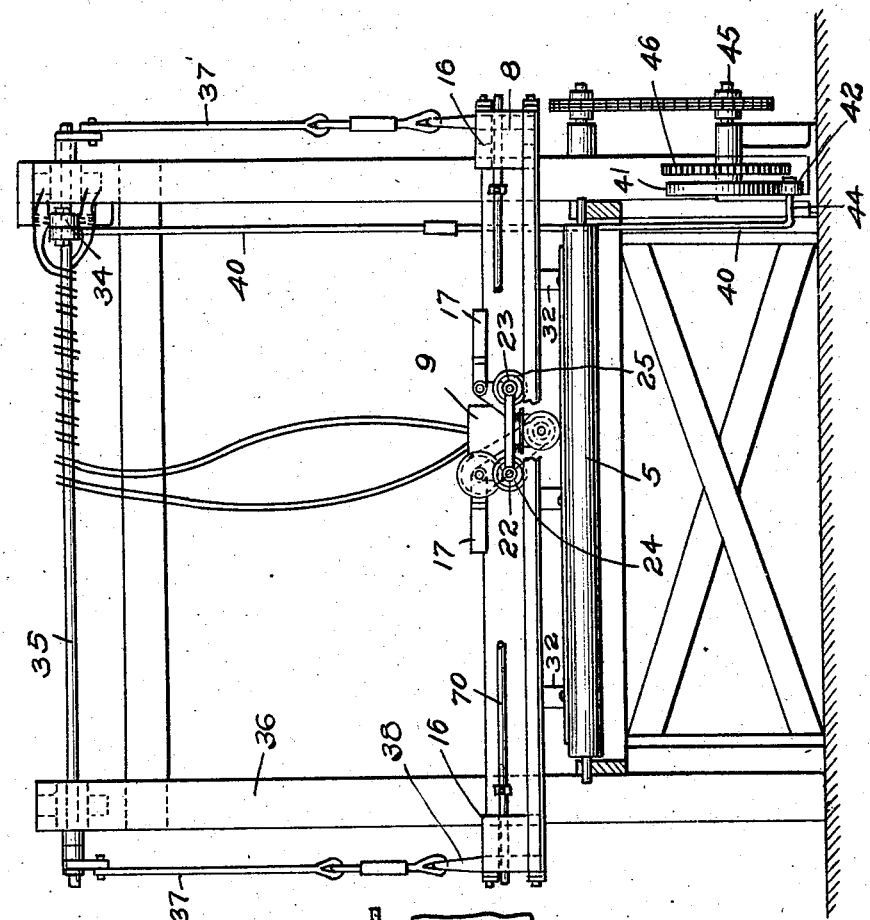
Figure 3:
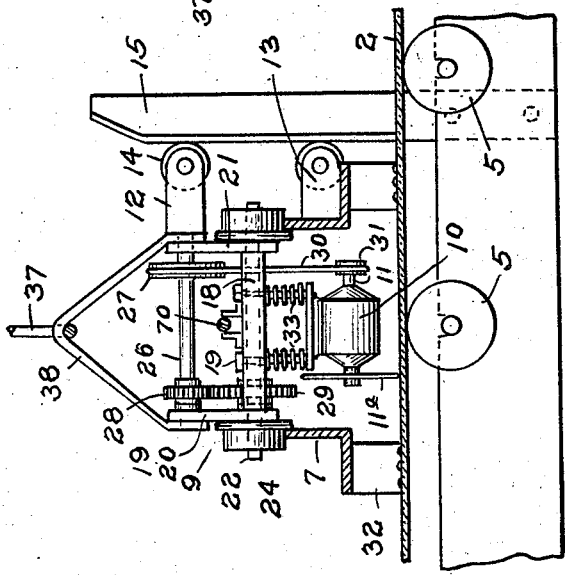
Figure 4:
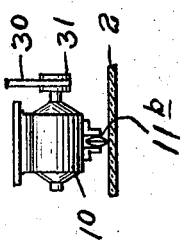
Figure 5:
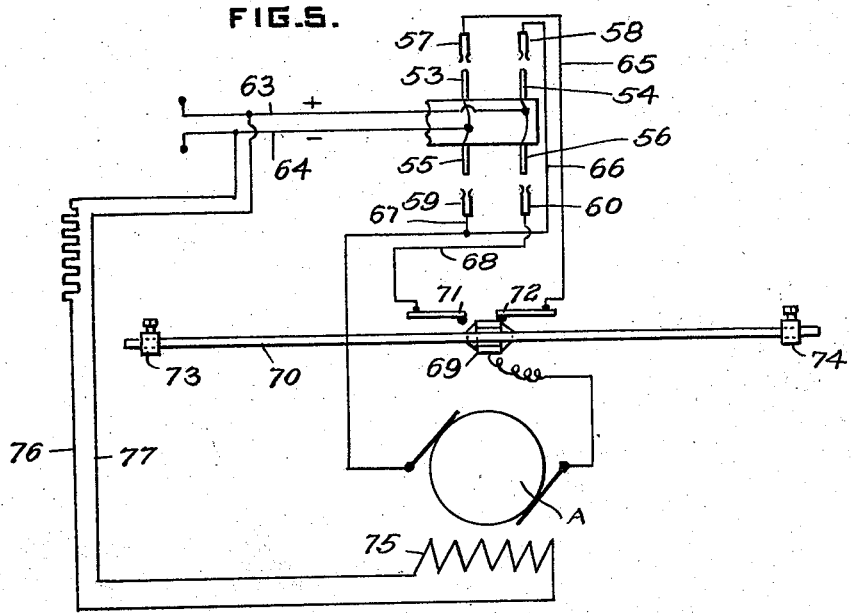
Figure 6:
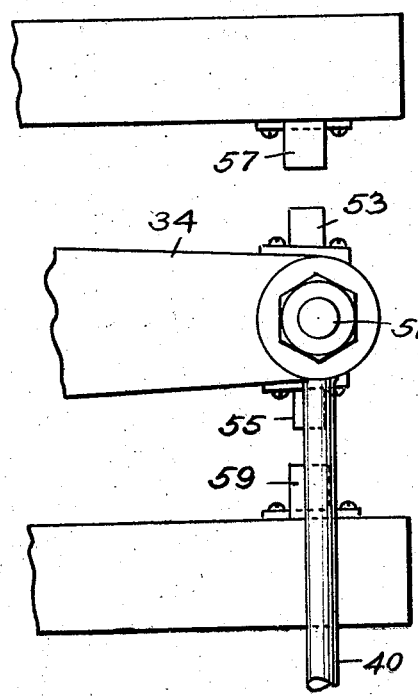
Figure 7:
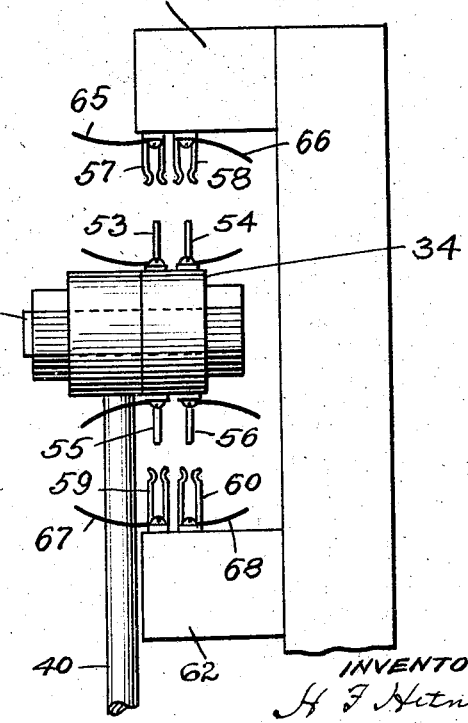

The invention relates to apparatus for cutting glass which is formed in a continuous sheet or ribbon into lengths or sections. It has for its principal object the provision of an improved and simplified form of apparatus for accomplishing the above function automatically. One embodiment of the invention is illustrated in the accompanying drawings wherein:

Figure 1 is a transverse section through the table on which the glass is delivered from the leer, showing the cutting apparatus in end elevation. Fig. 2 is a longitudinal section through the table showing the cutting apparatus in side elevation. Fig. 3 is an enlarged side elevation view of the motor and cutter carried thereby. Fig. 4 is a view similar to that of Fig. 3 showing a modified form of cutter. Fig. 5 is a diagrammatic view showing the electrical connections, and Figs. 6 and 7 are enlarged detail views of the reversing switches.

One of the primary features of construction is the use of a cutter frame extending transversely of the glass which during the cutting intervals rests upon the glass and is carried along thereby, and which in the intervals between cutting is lifted from the glass and swings by gravity back to starting position, the frame being provided with a motor and a cutter mounted for movement longitudinally thereof, by means of which the cutting operation is accomplished as the frame is carried along by the glass ribbon. This general feature of construction simplifies the apparatus, as the glass itself acts as the track or support for the cutting frame as well as the motive power for carrying it forward, thus avoiding the necessity of providing tracks and mechanical means for moving the frame forward with the glass during the cutting operation and then back to starting position.

Referring to the drawings, 1 is the outlet end of a leer through which a continuously formed sheet or ribbon of glass 2 is conducted upon the rollers 3 or other suitable conveying mechanism driven from the chain 4 engaging sprockets on the ends of the rollers. As it emerges from the leer the sheet is supported upon the series of rollers 5, carried by the framework 6.

The cutting-off device comprises a frame consisting of a pair of angles or rails 7, 7 secured rigidly together at their ends by the brackets 8, 8 (Fig. 1) and a carriage 9 mounted on the rails, and carrying the motor 10 upon the shaft 11 of which is mounted a cutting or scoring wheel 11$^a$ of carborundum, steel, or other suitable material.

The rails 7, 7 also carry at their ends the rearwardly projecting brackets 12 and 13 (Fig. 3) upon which are mounted the rolls 14 adapted to engage the guide plates 15 bolted to the framework 6 and serving to limit the movement of the cutting device to the right as hereinafter set forth. The brackets 8, which connect the ends of the rails 7, 7 also carry the dash pot cylinders 16 with which the plungers 17, mounted upon the carriage 9, are adapted to cooperate when the carriage reaches the ends of its stroke, so as to cushion the impact of the carriage at such points.

The carriage 9 consists of a bottom plate 18, from which the motor 10 is suspended by means of the bolts 19 as indicated in Fig. 3, and a pair of side plates 20 and 21 (Fig. 3) in which are journaled the shafts 22 and 23 carrying the pairs of wheels 24 and 25 of the carriage. These wheels are flanged as indicated in Fig. 3 and ride upon the vertical flanges of the rails 7, 7. Also journaled in the side plate 20 and 21 is a counter shaft 26, carrying the pulley 27 and the pinion 28, the latter of which meshes with the spur gear 29 keyed to the shaft 22. The pulley 27 is driven by a belt 30 (Fig. 3) passing around the pulley 31 on the shaft 11 of the motor. The motor thus acts through the belt and pulley connections and reduction gearing, as just described, to move the carriage 9 back and forth along the rails 7, 7.

In order to seat the carriage firmly upon the glass ribbon 2 during the cutting off operation, the rails 7, 7 are each provided with three legs or feet preferably in the form of the rubber blocks 32. Provision is made for holding the cutter yieldingly in operative position by the use of the springs 33 encircling the bolts 19 (Fig. 3).

The carriage and its supporting frame are raised and lowered by means of the pair of lever arms 34, pivoted at 35 upon a framework consisting of the posts 36 provided with suitable cross bracing, such levers carrying at their outer ends the cables 37 secured at their lower ends to the strap members 38 which are attached to the ends of the rails 7, 7 of the carriage frame. Slack is provided in the cables as indicated in Fig. 2 when the outer ends of the levers are in their lower positions as illustrated, so that the carriage frame is free to be carried along by the glass, as it rests thereon, during the cutting or scoring operation.

The levers 34 are swung about their pivot by means of the pull rod 40 operated from the cam 41, the pull rod being provided at its lower end with a roller 42 engaging the periphery of the cam. The bracket 43 in which the cam is journaled has one of its sides slotted so as to receive the laterally bent lower end 44 to the pull rod, thus providing a guideway for such lower end. The cam is keyed to its shaft 45 to which is also keyed the gear 46, and this gear is driven by the pinion 47 carried by the shaft 48. This shaft also carries the sprocket 49, which is driven by a chain 50 passing around a sprocket 51 on the end of one of the driven rolls 3. The gearing for driving the cam is arranged to give the cam one revolution for each length of glass to be cut from the ribbon.

The end of one of the levers 34 is pivotally secured to the upper end of the pull rod by means of the bolt 52 (Fig. 7) and such end is provided with two pairs of switch members, 53 and 54 and 55 and 56 adapted to cooperate with the switch members 57 and 58 and 59 and 60, said latter switch members being mounted on the brackets 61 and 62 projecting from the posts 36, the arrangement being such that when the end of the lever 34 is in its uppermost position the switch members 53 and 54 engage the switch members 57 and 58, and when such end is in its lower position the switch members 55 and 56 engage the switch members 59 and 60. The switch members 53, 54, 55 and 56 are connected to the incoming leads 63 and 64 as indicated in Fig. 5, while the switch members 57, 58, 59 and 60 are connected to the armature A of the motor 10 by means of the wires 65, 66, 67 and 68, with the interposed contact breaking switch comprising the member 69 carried by the slide rod 70 and the contact clips 71 and 72. The rod 70 is provided with a pair of adjustable stops 72 and 74 adapted to be engaged by the carriage 9 of the motor when the carriage reaches its extreme lateral positions, at which time it is desired to cut off the current through the armature. The field 75 of the motor 10 is supplied with current through the wires 76 and 77. This arrangement provided for automatically stopping the motor when the carriage reaches its extreme end positions and for reversing the direction of motion of the motor after each of said stops.

The operation of the apparatus is as follows, starting with the parts in the position of Fig. 2. At this time the roller 42 carried by the rod 40 engages the low portion $a$ of the cam 41 so that the left hand end of the lever 34 is lowered so that the carriage frame rests upon the glass sheet and is carried along thereby. At this same time, the right hand end of the lever 34 is in its upper position so that the switch members 53 and 54 (Fig. 5) engage the members 57 and 58, and there is a flow of current through the armature A of the motor 10 so that the motor is driven forwardly, thus rotating the cutter wheel $11^a$ and moving the carriage 9 across the sheet of glass from right to left (Figs. 1 and 5). This continues until the carriage strikes the stop 73, thus moving the rod 70 to the left and breaking the contact between the members 69 and 72, and cutting off the supply of current to the motor armature. This movement also brings the member 69 in contact with the member 71, so that provision is made for reversing the motor when the switch members 55 and 56 engage the members 59 and 60. During the foregoing operation the cam 41 has rotated so that the high portion $b$ engages the roller 42 moving the push rod down and lifting the carriage frame and the parts carried thereby free from the glass sheet and bringing the switch members 55 and 56 into engagement with the members 59 and 60. This reverses the current through the armature, so that the carriage runs backward on the rails 7, 7 to starting position, this movement being stopped when the carriage engages the stop 74 and shifts the rod 70 to the right thus separating the members 69 and 71 and stopping the motor. When the carriage frame and the parts carried thereby were lifted from the glass as above described, the parts were free to swing back to starting position, the rolls 14, at such time, engaging the guide plates 15 and establishing the starting position of the device. The carriage supporting frame is maintained in suspended position until the high portion of the cam passes the roller 42, and during this period, the length of glass which is to be cut off passes beneath the frame. At the end of this period the low portion of the cam reaches the roller 42 thus permitting the rod 40 to rise and lower the frame with its carriage onto the glass and the cycle is repeated.

Fig. 4 illustrates a modification of the cutter construction in which the small non-driven wheel $11^b$ takes the place of the driven wheel $11^a$ of Fig. 3, the construction in other respects being the same as that of Fig. 3.

What I claim is:

1. The combination with means for carrying forward a continuously formed horizontal ribbon of glass, of cutting off apparatus comprising a cutter frame above said means extending transversely thereof, cutter means mounted for movement longitudinally of the frame and having a motor for moving the cutter means along the frame, and means for raising and lowering the frame, so that during the cutting operation it may rest upon the glass and be carried along thereby.

2. The combination with means for carrying forward a continuously formed horizontal ribbon of glass, of cutting off apparatus comprising a cutter frame, means for suspending said apparatus above said carrying means, including flexible means extending upward from the apparatus, cutter means mounted for movement longitudinally of the frame and having a motor for moving the cutter means along the frame, and means for raising and lowering the flexible means, so that when the frame is lowered, it may engage the glass and be moved along therewith during the cutting operation.

3. The combination with means for carrying forward a continuously formed horizontal ribbon of glass, of cutting off means comprising a cutter frame above said means and extending transversely thereof, flexible means supporting said frame, a cutter means mounted for movement longitudinally of the frame and having a motor for moving the cutter means along the frame, means for raising and lowering the flexible means, so that when the frame is lowered, it may engage the glass and move forward therewith during the cutting operation, and stop means for engaging the cutter frame and limiting its movement to the rear when the flexible means are raised to lift the frame free from the glass.

4. The combination with means for carrying forward a continuously formed horizontal ribbon of glass, of cutting off means comprising a cutter frame above said means and extending transversely thereof, flexible means supporting said frame, a cutter means mounted for movement longitudinally of the frame and having a motor for moving the cutter means along the frame, means for raising and lowering the flexible means, so that when the frame is lowered it may engage the glass and move forward therewith during the cutting operation, and electrical connections for the motor including contact means operable by said raising and lowering movement for starting the motor forward to move the cutter means across the glass when the frame is lowered and for reversing the motor to move the cutter means in the reverse direction when the frame is raised.

In testimony whereof, I have hereunto subscribed my name this 18th day of Aug., 1923.

HARRY F. HITNER.